(12) United States Patent
Nagai

(10) Patent No.: US 7,443,473 B2
(45) Date of Patent: Oct. 28, 2008

(54) OPTICAL COMPENSATION POLARIZING FILM ACHIEVING A HIGHER VIEWING ANGLE

(75) Inventor: Hiroshi Nagai, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 454 days.

(21) Appl. No.: 11/344,420

(22) Filed: Jan. 31, 2006

(65) Prior Publication Data
US 2006/0170850 A1    Aug. 3, 2006

(30) Foreign Application Priority Data
Jan. 31, 2005   (JP) ............................. 2005-023753

(51) Int. Cl.
*G02F 1/1335* (2006.01)
(52) U.S. Cl. .................. 349/117; 349/119; 349/120
(58) Field of Classification Search .......... 349/117–120
See application file for complete search history.

(56) References Cited

U.S. PATENT DOCUMENTS

| | | | |
|---|---|---|---|
| 6,937,310 B2 * | 8/2005 | Elman et al. ................ | 349/118 |
| 7,072,015 B2 * | 7/2006 | Maeda ........................ | 349/120 |
| 2004/0160559 A1 * | 8/2004 | Kim et al. ................... | 349/117 |
| 2005/0140900 A1 * | 6/2005 | Jeon et al. ................... | 349/141 |

FOREIGN PATENT DOCUMENTS

JP    2001-242462    9/2001

* cited by examiner

*Primary Examiner*—David C. Nelms
*Assistant Examiner*—John Heyman
(74) *Attorney, Agent, or Firm*—Hayes Soloway P.C.

(57) ABSTRACT

An LCD device includes first and second compensation polarizing films sandwiching therebetween a homogeneously-oriented liquid crystal layer. The first compensation polarizing film includes a polarizing film having an in-plane retardation of 35 to 245 nm, wherein $n1 \geq nz > n2$, wherein $n1$ and $n2$ are refractive indexes of optical axes extending perpendicular to each other within the first retardation film and $nz$ is a thickness-direction refractive index of the first retardation film. The second compensation polarizing film has a protection layer, a polarizing film and a retardation film having an in-plane retardation of 0 to 10 nm and thickness-direction retardation of 0 to 35 nm.

7 Claims, 6 Drawing Sheets

OPTICAL COMPENSATION POLARIZING FILM ACHIEVING A HIGHER VIEWING ANGLE

BACKGROUND OF THE INVENTION

1. Filed of the Invention

The present invention relates to an optical compensation polarizing film and a liquid crystal display (LCD) device, and more specifically to an optical compensation polarizing film capable of improving viewing angle characteristics concerning contrast ratio and chromaticity, and an LCD device of a homogeneous orientation type using such an optical compensation polarizing film.

2. Description of the Related Art

There has been a proposal for an IPS (in-plane switching)-mode LCD device in which an electric field parallel to a substrate is generated between a pixel electrode and a common electrode. The IPS-mode LCD device is known for its capability of allowing a wider viewing angle than a TN-mode LCD device. The IPS-mode LCD device generally has a pair of substrates, a liquid crystal layer sandwiched between the paired substrates, and first and second polarizing layers respectively adhered onto the outer surface of the substrates. In the LCD device, orientation directions of the polarizing films and the liquid crystal layer at initial orientation are such that black color is displayed when no electric field is applied between the electrodes. The orientation direction of the liquid crystal layer is changed so as to obtain an optical path of $\lambda/4$ when an electric field is applied, thereby displaying white color.

In the LCD device, polarizing films are used to control transmission of light by changes in orientation of liquid crystal. The polarizing films each are usually constructed by layering a transparent protection film (TAC: triacetylcellulose) on a polarizing layer. The polarizing layer is an optical element which divides incident light into two polarization components perpendicular to each other. One of the components that has an oscillation direction parallel to the transmission axis of the polarizing layer is allowed to pass through the LCD device. The other one of the components that has an oscillation direction parallel to the absorption axis of the polarizing layer is absorbed or dispersed.

LCD devices having a homogeneously-oriented liquid crystal layer, including a transmissive IPS type, are constructed by sandwiching liquid crystal cells between polarizing films from both sides in the thickness direction of the cells. In general, polarizing layers in both sides are positioned such that transmissive axes are perpendicular to each other. A pair of polarizing layers in which transmission axes thereof are arranged perpendicular to each other are called an orthogonal polarizer.

Generally, characteristics of an orthogonal polarizer depend on viewing angles. When light enters from a direction oblique to the orthogonal polarizer, directions of transmission axes change. Therefore, even if first and second polarizing layers are layered such that transmission axes of these layers are perpendicular to vertically incident light, crossing angles with respect to obliquely incident light deviate from right angles. As a result, polarized light which has passed through the first polarizing layer has a component in the direction parallel to the transmission axis of the second polarizing layer. This component transmits through the second polarizing layer, causing leakage of light.

Dependency of the orthogonal polarizer on viewing angles, as described above, adversely affects luminance and contrast ratio of the screen of the LCD device and becomes a factor which narrows a visible range (viewing angle) in which a suitable chromaticity can be achieved. To realize an LCD device having a wider viewing angle, developments of an optical compensation polarizing film as described below are necessary. That is, an optical compensation polarizing film has to be developed to suppress dependency of the orthogonal polarizer on viewing angles, to thereby increase the visible range (viewing angle) in which leakage of light is not perceived. Several proposals have been made for such an optical compensation polarizing film.

JP-A-2001-242462 describes a technique to restrict leakage of light as described above in a homogeneously-oriented LCD device, such as an IPS-mode LCD device. In the described technique, a biaxial-birefringent film (optical compensation film) is used to achieve compensation such that a component of obliquely incident light that is parallel to the transmission axis of a second polarizer becomes perpendicular thereto, thereby suppressing leakage of light.

DISCLOSURE OF THE INVENTION

1. Problems to be Solved by the Invention

However, in the conventional technique described above, an optical compensation film which has dependency on wavelengths similarly to the liquid crystal layer, and added thereto cannot optically compensate for all the wavelengths, although a remarkable advantage may be expected with respect to particular wavelengths by only addition of the single layer. This cannot solve the problem of occurrence of leakage light. In addition, the polarizing film is configured by a polarizing layer and a transparent protection layer. This transparent protection layer has a retardation corresponding to the thickness thereof. Consequently, obliquely incident light which has been transformed into linearly polarized light by a light-incident-side polarizing film is transformed into elliptically polarized light by the transparent protection layer and may further cause changes in polarization at the liquid crystal layer. This may involve a problem, i.e., leakage of light and coloring on the screen.

In view of the above problems of conventional techniques as described above, it is an object of the present invention to provide an optical compensation polarizing film pair having a function of equalizing the polarization of light obliquely entering and passing through a polarizing layer to the polarization of light vertically entering and passing therethrough, and compensating for changes in optical characteristics of the polarizing film over a broad wavelength range.

It is another object of the present invention to provide an LCD device having a wider viewing angle by using the optical compensation polarizing film as described above.

2. Means for Solving the Problems

The present invention provides an optical compensation polarizing film pair including: a first compensation polarizing film including a first protecting layer, a first polarizing layer, a first retardation film and a negative-uniaxial second retardation film, which are arranged in this order: and a second compensation polarizing film used in pair with the first compensation polarizing film and including a second protecting layer, a second polarizing layer, and a third retardation film, which are arranged in this order:

the first retardation film having a birefringence wherein an in-plane retardation is 35 to 245 nm, and refractive indexes therein satisfy the following relationship: $n1 \geqq nz > n2$, given $n1$ and $n2$ being refractive indexes of optical axes extending perpendicular to each other within the first retardation film and given nz being a thickness-direction refractive index of the first retardation film, one of the optical axes of the first retardation film having the refractive index of n1 extending normal to an absorption axis of the first polarizing layer;

the second retardation film having a birefringence wherein an in-plane retardation is 0 to 15 nm, and a thickness-direction retardation is 50 to 123 nm, the second retardation film having an optical axis normal to a surface of the first polarizing layer;

the third retardation film having a birefringence wherein an in-plane retardation is 0 to 10 nm and a thickness-direction retardation is 0 to 35 nm.

In the optical compensation polarizing film pair and the LCD device of the present invention, it is possible to reduce leakage of light in the oblique view during displaying black color in the LCD device. In addition, changes in chromaticity between the normal view (front view) and the oblique view can be suppressed, to thereby improve the image quality of the LCD device.

A preferred embodiment of the present invention adopts a small retardation in the thickness direction of a polarizing-film protection layer existing on the side of the liquid crystal layer of the light-incident-side polarizing film. Preferably, the retardation in the thickness direction (thickness-direction retardation) should be set to 17 nm or less, to thereby inhibit the light obliquely entering into the liquid crystal layer from being transformed into elliptically polarized light by the protection layers protecting the polarizing layers. As a result, changes in phases depending on wavelengths, which are caused by the liquid crystal layer, can be suppressed, whereby light can be transmitted in a state similar to linear polarization.

The optical compensation film including the first and second retardation layers and provided between the light-emitting-side polarizing layer and the liquid crystal layer has functions as follows. This optical compensation film functions to once transform linearly polarized light emitted from the liquid crystal layer into elliptically polarized light by the second retardation film (nc) having a negative-uniaxial optical characteristic and having an optical axis extending in a direction normal to the surface of the polarizing layer. The optical compensation film next functions to transform elliptically polarized light emitted from the second retardation film (nc) again into linearly polarized light by the first retardation film (na) having a negative-uniaxial or biaxial optical characteristic, having the smallest refractive index, and having an optical axis parallel to the surface of the polarizing layer.

With respect to the polarized light subjected to this change in polarization, the direction of the polarization axis of the polarized light emitted from the liquid crystal layer is different from the direction of the polarization axis of the polarized light after being emitted from the first retardation film (na). By setting the in-plane retardation of the first retardation film (na) within a range of 35 to 245 nm and by setting the retardation of the second retardation film (nc) in the thickness direction within a range of 50 to 123 nm, the polarized light functions to cancel dependency of the orthogonal polarizer on the viewing angle, which causes the crossing angle to deviate from the right angles with respect to obliquely incident light, that is, the polarization axis is changed to an absorption axis direction of the light-emitting-side polarizing film. In this optical compensation film, wavelength dependency of birefringence is directly reflected on color dispersion if optical compensation is carried out in one direction (for example, linearly) by a single biaxial retardation film. On the other hand, by performing optical compensation in two directions (for example, light having a shorter wavelength and having stronger dependency on wavelengths has a longer optical path) by a combination of two retardation films, the wavelength dependency is canceled in the light-emitting side, whereby the color dispersion is decreased.

As a result, the wavelength dependency of the birefringence of the liquid crystal layer and that of the optical compensation films are reduced. Leakage of light in the oblique direction during displaying black color is thus suppressed. At the same time, optical compensation is possible over a broad wavelength range without coloring. The viewing angle characteristics can be thus improved.

DETAILED DESCRIPTION OF THE PREFERRED EMBODIMENT(S)

Figure 1:
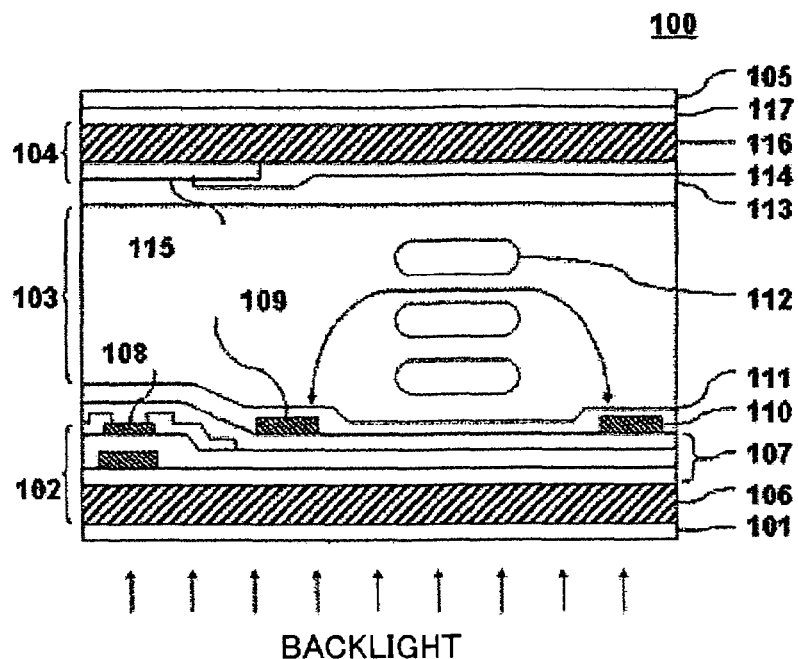
FIG. 1 is a sectional view of an LCD device according to first and second embodiments of the present invention.

Hereinafter, embodiments of the present invention will be described in details with reference to the accompanying drawings. FIG. 1 is a sectional view showing an LCD device according to a first embodiment of the present invention. The LCD device 100 is configured as an IPS-mode LCD device having a homogeneously-oriented liquid crystal layer. The LCD device 100 has a first polarizing layer 101 in the light-incident side, a thin-film-transistor-array substrate (TFT substrate) 102, a liquid crystal layer 103, a color-filter (CF) substrate 104, and a second polarizing layer 105 in the light-emitting side, which are arranged in this order from the side of a backlight light source. Between the liquid crystal layer 103 and the TFT substrate 102, an orientation film 111 is provided. Another orientation film 113 is provided between the liquid crystal layer 103 and the CF substrate 104. The TFT substrate 102 includes a glass substrate 106, and a layered structure formed thereon and configuring an insulating film 107, TFTs 108, pixel electrodes 109, and counter electrodes 110.

The TFTs 108 each control the electric potential applied to the pixel electrode 109. In the LCD device 100, the pixel electrodes 109 and the counter electrodes 110 are formed on the TFT substrate 102. Liquid crystal molecules 112 in the liquid crystal layer 103 are applied with electric fields in the lateral directions. The insulating layer 107 includes a silicon nitride film. The CF substrate 104 includes color filters 114, a light shielding layer 115, and a glass substrate 116. The color filters 114 color light which has passed through the liquid crystal layer 103 in any of three primary colors. The light shielding layer 115 shields TFTs 108, data lines not shown, and the like. In case of a monochrome LCD device, the color filter 114 is omitted from this structure.

Figure 2A:
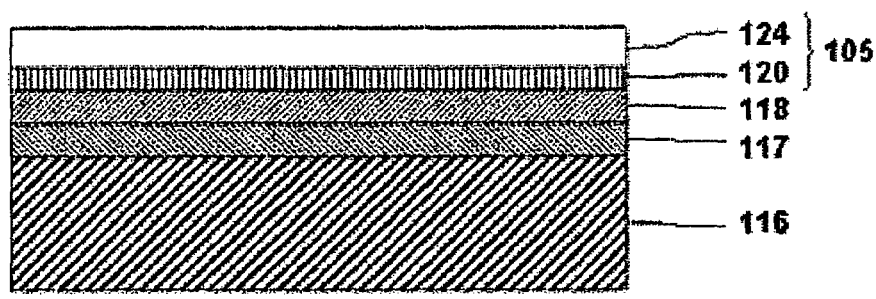
FIGS. 2A and 2B are sectional views each showing an enlarged part of the LCD device 100 of the first embodiment shown in FIG. 1.
Figure 2B:
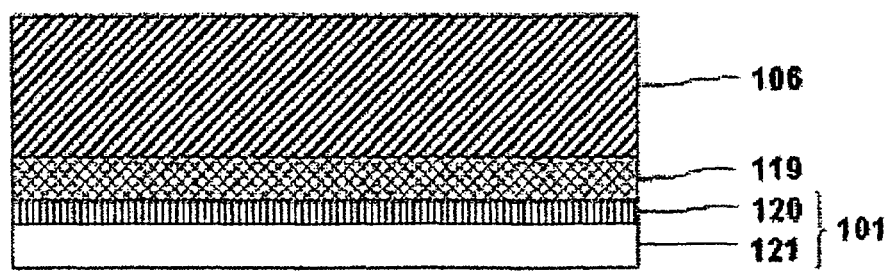

FIGS. 2A and 2B each show an enlarged part of the LCD device 100 shown in FIG. 1. FIG. 2A shows, in the light-emitting side, a second polarizing layer 105, retardation films 117 and 118, and the CF substrate 104 including a glass substrate 116. FIG. 2B shows, in the light-incident side, a first polarizing layer 101, a retardation film 119, and the TFT substrate 102 including a glass substrate 106. The first polarizing layer 101 in the light-incident side includes a polarizing layer 120 made of, for example, PVA (polyvinylalcohol), and a protection layer 121 made of, for example, TAC, as shown in FIG. 2B. The second polarizing layer 105 in the light-emitting side includes a polarizing layer 120 and a protection layer 124, as shown in FIG. 2A.

As shown in FIG. 2A, retardation films 117 and 118 having predetermined optical characteristics are provided between the glass substrate 116 and the second polarizing layer 105 in the light-emitting side. As shown in FIG. 2B, a retardation film 119 having a predetermined optical characteristic is provided between the glass substrate 106 and the first polarizing layer 101 in the light-incident side. A conventional polarizing film is used, with both sides of a polarizing layer thereof sandwiched between protection layers (TAC).

The arrangement of the present embodiment is such that the protection layer of the light-emitting-side polarizing film 105 in the side of the glass substrate is replaced by the retardation films 117 and 118, and that the protection layer of the light-incident-side polarizing film 101 in the side of the glass substrate is replaced by retardation film 119. The retardation films have a function of protecting the polarizing layers. The protection layers 121 and 124 each function as a negative-uniaxial retardation film whose optical axis extends in a direction normal to the faces of the polarizing films. The protection layers 121 and 124 respectively have retardations corresponding to the thicknesses of these layers 121 and 124. The retardation films 117, 118, and 119 can be formed, for example, by adhesion or coating of films. If the retardation of the retardation film 119 in the thickness direction thereof is 0 nm, polarization light does not cause a phase change even when the polarizing film is directly adhered to a glass substrate without a protection layer. Therefore, a similar effect can be attained.

In the above, optical compensation polarizing films constituting the LCD device 100 were subjected to a simulation which adopted the structure shown in FIGS. 2A and 2B. With respect to optical characteristics including the retardations of the retardation films 117, 118, and 119, conditions under which leakage of light in an oblique view during displaying black color can be reduced to an unnoticeable level. Before the simulation, an experiment was carried out by gradually lowering luminance of a backlight in a conventional IPS-mode LCD device, to confirm: at what level of luminance of the backlight, as the luminance is being lowered, leakage of light in an oblique view during displaying black color would not significantly influence image quality. The following could be confirmed as a result of this experiment. When the luminance of the backlight was ½ of normal luminance, leakage of light in the oblique view during displaying black color came to make less influence on display. When the luminance of the backlight was ¼, leakage of light in the oblique view during displaying black color was not substantially conceived. Hence, as a level at which leakage of light is not perceived in case of observing the image from the oblique view during displaying black color, such a level was adopted that reduced the intensity of leakage light to half the reference luminance, wherein the reference luminance is determined in the case of observing an orthogonal polarizer from an oblique direction.

Chromaticity differences were expressed using Δu 'V'. A chromaticity ratio between directions of front and oblique views without optical compensation was assumed as 1. A range in which chromaticity ratios when observed from the directions of the front and oblique views were not adversely affected by optical compensation was also adopted as a condition for selecting a range. References for selecting ranges of retardations of the retardation films 117 and 119 in the thickness direction were set to a range as follows. That is, in the range, the films 117 and 119 could be used generally as polarizing-film protection layers, and the effect of suppressing leakage of light could be greater compared with a case of using a TAC layer of 80 μm (retardation in the thickness direction=50 nm) having a negative-uniaxial optical characteristic of (n1−N2)≈0 as well. As a direction of an oblique view for these films, the direction at an azimuth angle 45° and a polar angle 45° to the optical axis of the polarizing films was adopted.

Figure 3:
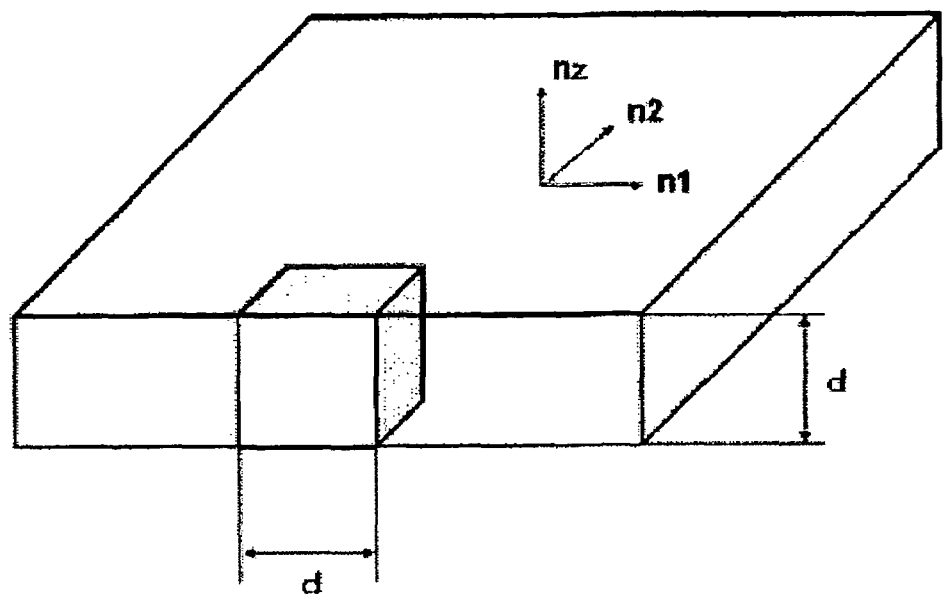
FIG. 3 is a perspective view showing retardation of a retardation film.

Definition of retardation of a retardation film is shown in FIG. 3, wherein the in-plane refractive indexes including the optical major-axis are n1 and n2, the refractive index in the thickness direction (thickness-direction refractive index) is nz, d [mm] is the effective thickness of the retardation film in terms of the thickness of the liquid crystal layer. The in-plane retardation is defined as an absolute value of (n1−n2)×d, and the retardation in the thickness direction is defined as [{(n1+n2)/2}−nz]×d. In the simulation, retardation films 117 and 119 having a negative-uniaxial optical characteristic of (n1−n2)≈0 were used, and a retardation film 118 having an optical characteristic of (ns−nz)/(ns−nf)=0 was used. The symbols ns and nf as used herein are the slow axis and the fast axis, respectively, of the retardation film 18. It is to be noted that the refractive indexes n1 and nz may be equal to the ordinary light index no, whereas the refractive index n2 may be equal to the extraordinary light index ne. Thus, the retardation film 18 satisfies the relationship no=n1≧nz>n1=n2.

In the simulation, ranges in which leakage of light in the oblique view from the direction at the azimuth angle 45° and the polar angle 45° during displaying black color could be suppressed to an unnoticeable level were derived under the conditions wherein: the retardation of the retardation film 117 in the thickness direction thereof was set at 50 nm and 80 nm; the in-plane retardation of the retardation film 118 was set at 130 nm; and the retardation of the retardation film 119 in the thickness direction thereof was set at 0 to 50 nm.

Figure 4:
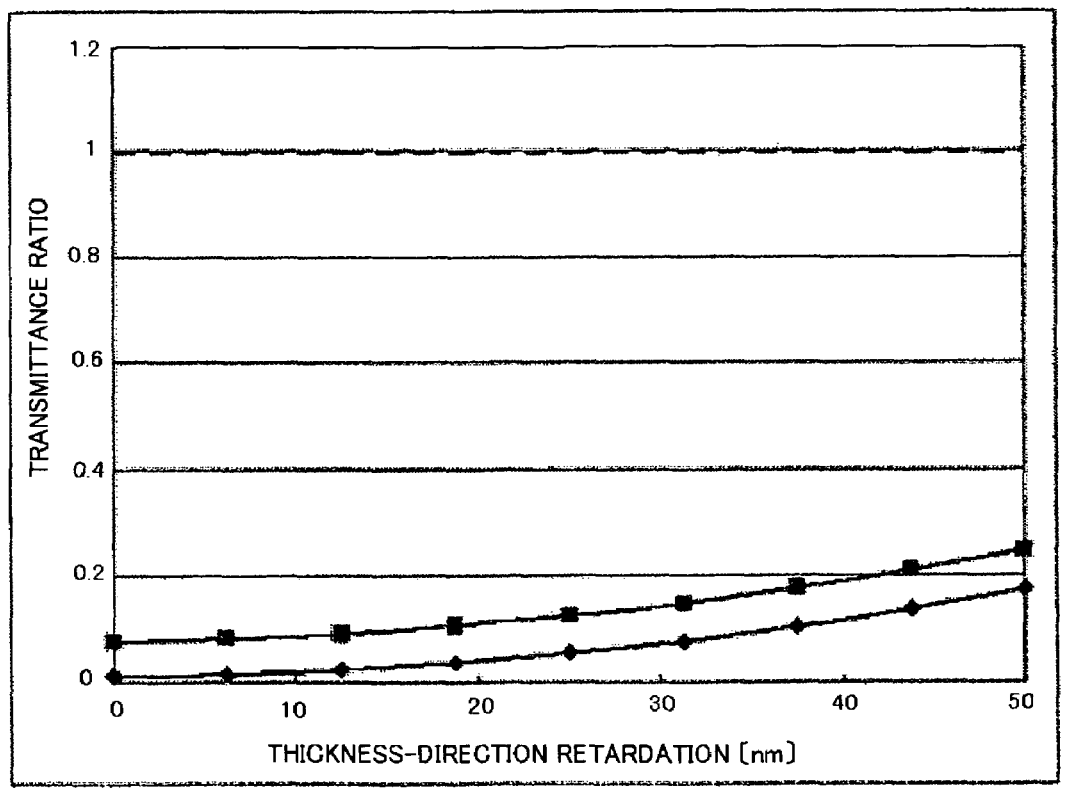
FIG. 4 is a graph showing a relationship between retardation films 117 and 119 and a transmittance ratio.

The derived ranges are shown in FIG. 4, wherein the thickness-direction of the retardation film 119 is plotted on abscissa, and the transmittance ratio is plotted on ordinate. A curve plotted by triangles is obtained in the case wherein the thickness-direction retardation of the retardation film 117 is 50 nm, another curve plotted by squares is obtained in the case where the thickness-direction retardation of the retardation film is 80 nm, and a dotted line is the case without using the compensation films, wherein the retardation of the retardation films 117 and 119 is equivalent to that of a TAC film having a thickness of 80 μm and the retardation film 118 is not used. Within the ranges according to this simulation, the transmittance ratio is 0.5 or less throughout the whole range of retardation of the retardation film 119 in the thickness direction. Thus, an optical compensation effect can be recognized. From studies in details of the effect of each of the retardation films, it has been found that the transmittance decreases as the retardation of the retardation film 117 in the thickness direction is increased and as the retardation of the retardation film 119 in the thickness direction is decreased.

Figure 5:
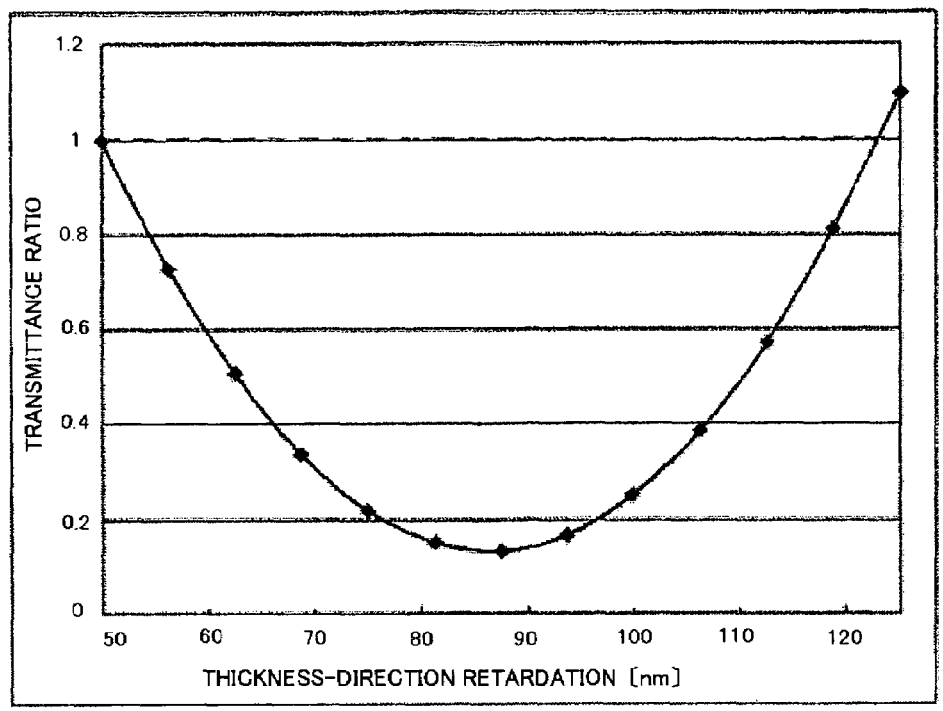
FIG. 5 is a graph showing a relationship between a retardation film 117 and a transmittance ratio.
Figure 6:
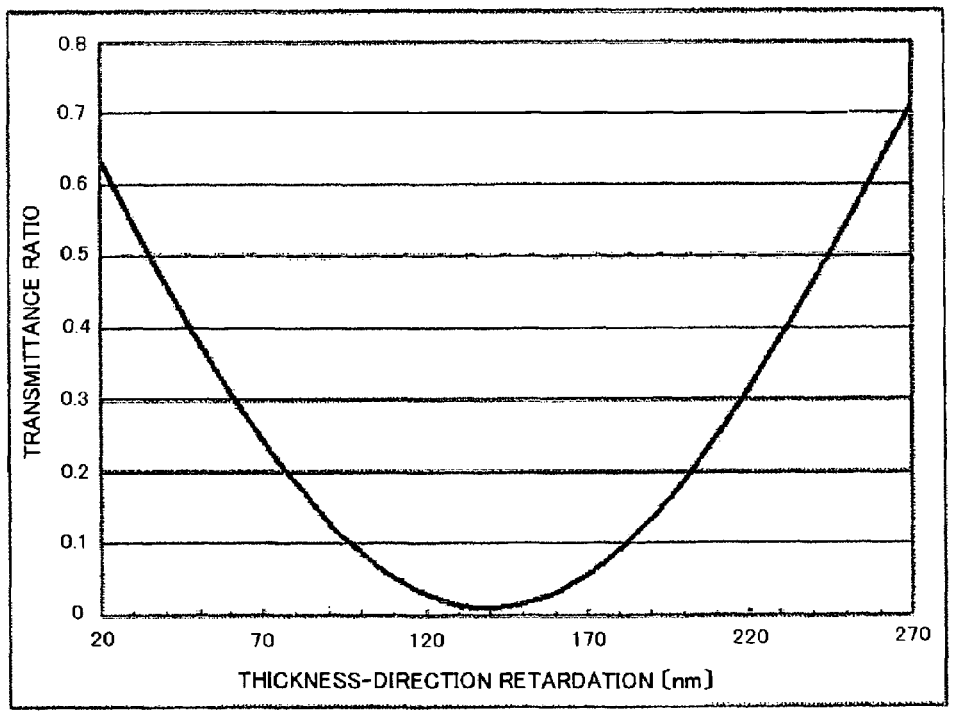
FIG. 6 is a graph showing a range of in-plane retardation of the retardation film 119, in which leakage of light during displaying black color can be reduced.

Next, the range of the retardation film 117 was derived under the conditions wherein: the in-plane retardation of the retardation film 118 was 130 nm; and the retardation of the retardation film 119 in the thickness direction was 0 nm. The derived range is shown in FIG. 5, wherein the thickness-direction retardation of the retardation film 117 is plotted on abscissa whereas the transmittance ratio is plotted on ordinate. A curve plotted by squares is obtained in the case where the thickness-direction retardation of the retardation film 119 is 0 nm, whereas the dotted line is obtained in the case where the thickness-direction retardation of the retardation film is 50 nm. As can be seen from this figure, the transmittance decreases within the range of 50 to 123 nm of the retardation of the retardation film 117 in the thickness direction. The range of the retardation film 118 was derived under the conditions wherein: the retardation of the retardation film 117 in the thickness direction was 80 nm; and the retardation of the retardation film 119 in the thickness direction was 0 nm. The derived range is shown in FIG. 6, wherein the thickness-direction retardation of the retardation film 119 is plotted on abscissa whereas the transmittance ratio is plotted on ordinate. A solid curve is obtained for the case wherein the thickness-direction retardations of the retardation films 117 and 119 are 80 nm and 0 nm, respectively, and a dotted line is obtained for the case without using the optical compensation, wherein the retardations of the retardation films 117 and 119 are equivalent to that of a TAC film having a thickness of 80 μm. As understood from the figure, the in-plane retardation of the retardation film 118 is within the range of 35 to 245 nm, and the transmittance ratio is 0.5 or less.

Figure 7:
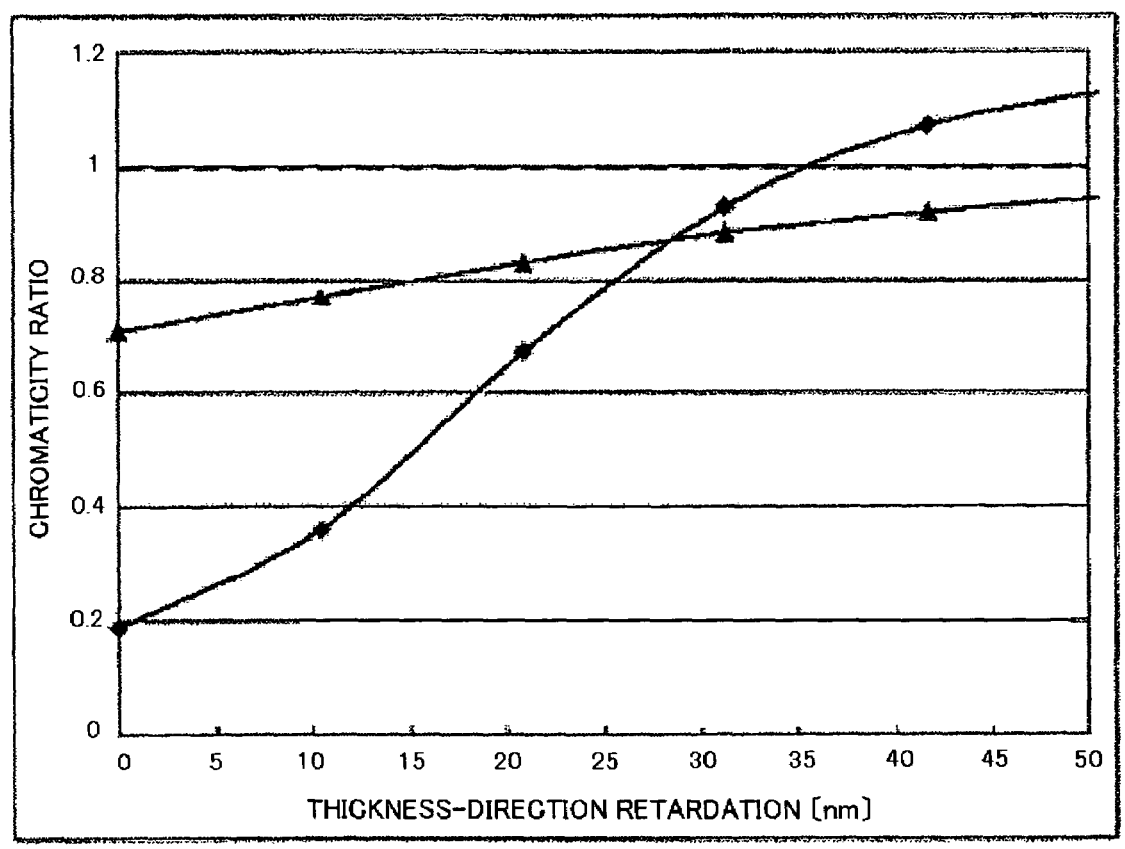
FIG. 7 is a graph showing a relationship between the retardation films 117 and 119 and a chromaticity ratio.

On the other hand, the range in which the chromaticity ratio between the directions of the front and oblique views does not deteriorate was derived under the conditions wherein: the retardation of the retardation film 117 in the thickness direction was set at 50 and 80 nm; the in-plane retardation of the retardation film 118 was 130 nm; and the retardation of the retardation film 119 in the thickness direction was 0 to 50 nm. The derived range is shown in FIG. 7, wherein the thickness-direction retardation of the retardation film 119 is plotted on abscissa whereas the chromaticity ratio is plotted on ordinate. A curve plotted by triangles is obtained in the case wherein the thickness-direction retardation of the retardation film 117 is 50 nm, another curve plotted by squares is obtained for the case wherein the thickness-direction retardation of the retardation film 117 is 80 nm, and a dotted line is obtained for the case without using the optical compensation, wherein the retardation of the retardation films 117 and 119 is equivalent to that of a TAC film having a thickness of 80 μm, and the retardation film 118 is not used. Within the range of this simulation, the chromaticity ratio is 1 or less throughout the range of 0 to 50 nm of the retardation of the retardation film 119 in the thickness direction, when the retardation of the retardation film 117 in the thickness direction is 50 nm. Next, when the retardation of the retardation film 117 in the thickness direction is 80 nm, the chromaticity ratio is 1 or less, within the range of 35 nm or less of the retardation of the retardation film 119 in the thickness direction. As the retardation of the retardation film 119 further decreases, the chromaticity ratio decreases.

As has been described above, the chromaticity ratio is dependent on the retardation of the retardation film 117 in the thickness direction. Hence, a simulation was carried out within a range including the range of 50 to 123 nm of the retardation of the retardation film 117 in the thickness direction, which effectively reduced the luminance. A combination of retardations of the retardation films 117 and 119 that provides a chromaticity ratio of 1 or less was derived and shown in FIG. 8, wherein the thickness-direction retardation of the retardation film 119 is plotted on abscissa, the thickness-direction retardation of the retardation film 117 is plotted on ordinate, and the chromaticity ratio is expressed by contour lines. The two contour lines shown in FIG. 8 represent chromaticity ratios of 1 and 0.5.

The following has been found from this figure. Selection of a part in which the transmittance ratio is 0.5 or less and the chromaticity ratio is 1 or less provides a rectangular area shown in FIG. 8, i.e., wherein the retardation of the retardation film 119 in the thickness direction falls within the range of 0 to 35 nm, and retardation of the retardation film 117 in the thickness direction falls in a range of 50 to 123 nm.

Figure 8:
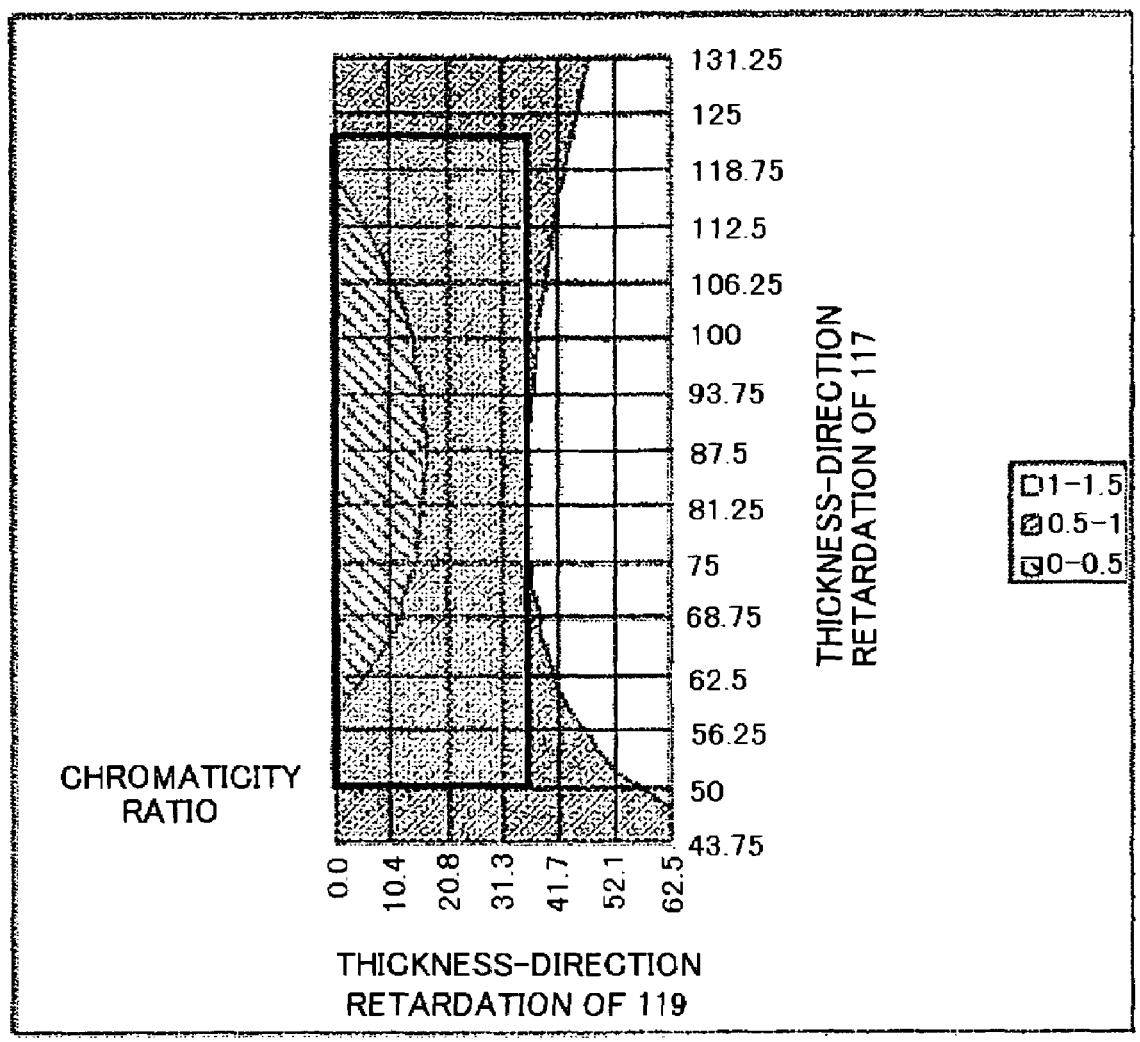
FIG. 8 is a graph showing retardations of the retardation films 117 and 119 in the thickness direction where the transmittance ratio is 0.5 or less and the chromaticity ratio is 1 or less.

In the result shown in FIG. 8, a range which reduces the chromaticity ratio to half is selected here as the range effective for reducing the chromaticity ratio. Where the retardation nil of the retardation film 119 in the thickness direction is within the range of 0 to 17 nm, the retardation ncl of the retardation film 117 in the thickness direction should fall in the range as follows.

$$57.0 - 0.23 \times nil + 0.11 \times nil^2 \leq ncl \leq 120.0 - 0.42 \times nil - 0.08 \times nil^2$$

Thus, the retardation of the retardation film 119 in the thickness direction is reduced to be smaller than the retardation of TAC in the thickness direction, which is used for protection layers in conventional polarizing films. Changes in polarization in the liquid crystal layer are thereby reduced. Therefore, both the luminance ratio and the chromaticity ratio can be reduced to half values by using the present optical compensation polarizing film in a homogeneously-oriented LCD device.

As a result of suppressing leakage of light in the oblique direction during displaying black color, the contrast ratio in the front direction improves to provide an image of higher resolution. It is known that a surface treatment is conducted on a polarizing film which has been subjected to a haze treatment for the purpose of improving visibility of an LCD device, the surface treatment causing large leakage of light in an oblique direction during displaying black color without optical compensation. In this case, a problem occurs in that light emitted in the oblique direction is emitted in the front direction due to the surface treatment, to thereby deteriorate the contrast ratio. Against this problem, light in the oblique direction, which is emitted in the front direction due to the surface treatment, is suppressed by performing optical compensation, to lower the luminance in the front direction during displaying black color.

In the present embodiment, the combination of retardations of the retardation films 117 and 119 is set within the range indicated by the frame of the thick line in FIG. 8, and the transmittance ratio of the retardation film 118 is set within the range of 0.5 or less as shown in FIG. 6. In this manner, leakage of light in the oblique view during displaying black color is reduced to an unnoticeable level without deterioration in the chromaticity ratio between the directions of the front and oblique views. This can be considered as follows. Dispersion of light caused by the liquid crystal layer 103 and the CF substrate 104 can be suppressed by the retardation films 117 and 118, by setting the retardations of the retardation films 117, 118, and 119 in consistence with the combination within the range described above. As a result, a state of less dispersion of light can be created at the position of the polarizing layer 120 configuring the second polarizing layer 105 in the light-emitting side. In the present embodiment, leakage of light in the oblique view during displaying black color can be reduced as described above, whereby the image quality of the LCD device improves.

Next, a second embodiment of the present invention will be described. A LCD device according to the second embodiment of the present invention has a sectional structure similar to the sectional structure shown in FIG. 1, and will be described with reference to FIG. 1. Also in the present embodiment, the LCD device 100A is constructed as an IPS-mode LCD device having a homogeneously-oriented liquid crystal layer. The LCD device 100A has a first polarizing layer 101 in the light-incident side, a thin film transistor array substrate (TFT substrate) 102, a liquid crystal layer 103, a color filter (CF) substrate 104, and a second polarizing layer 105 in the light-emitting side, which are arranged in this order from the side of a backlight light source. Between the liquid crystal layer 103 and the TFT substrate 102, an orientation film 111 is provided. Another orientation film 113 is provided between the liquid crystal layer 103 and the CF substrate 104. The TFT substrate 102 includes a glass substrate 106, an insulating film 107, TFTs 108, pixel electrodes 109, and counter electrodes 110.

The TFTs 108 each control the electric potential applied to the pixel electrode 109. In the LCD device 100, the pixel electrodes 109 and the counter electrodes 110 are formed on the TFT substrate 102. Liquid crystal molecules 112 in the liquid crystal layer 103 are applied with electric fields in the lateral directions. The insulating layer 107 includes a silicon nitride film. The CF substrate 104 includes a color filter 114, a light shielding layer 115, and a glass substrate 116. The color filter 114 colors light which has passed through the liquid crystal layer 103 in any of three primary colors. The light shielding layer 115 shields TFTs 108, data lines not shown, and the like. However, in case of a monochrome LCD device, the color filter 114 is omitted.

Figure 9A:
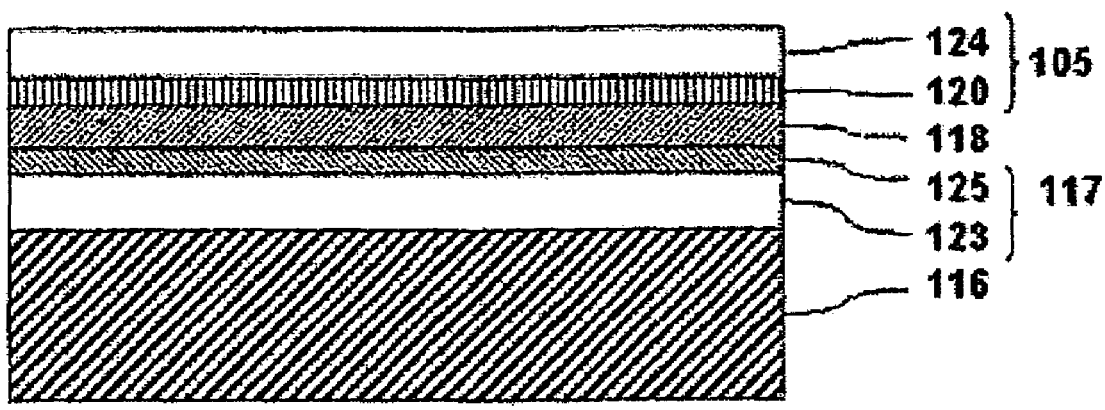
FIGS. 9A and 9B are sectional views each showing an enlarged part of an LCD device according to the second embodiment of the present invention.
Figure 9B:
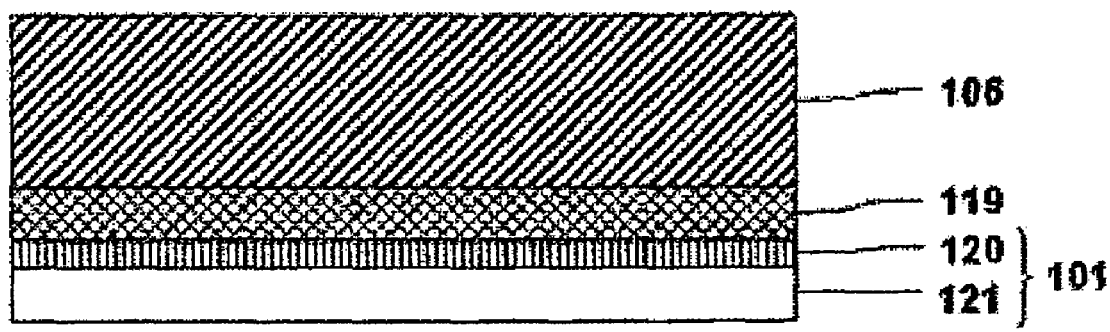

FIGS. 9A and 9B each show an enlarged part of the LCD device 100A according to the present embodiment. FIG. 9A shows, in the light-emitting side, a second polarizing layer 105 retardation films 118, 125, and 123, and the CF substrate 104 including a glass substrate 116. FIG. 9B shows, in the light-incident side, a first polarizing layer 101, a retardation film 119, and the TFT substrate 102 including a glass substrate 106. The retardation films 123 and 125 are negative-uniaxial retardation films having an optical axis in a direction normal to the surface of the polarizing films. These two retardation films 123 and 125 are coupled together to have an optical characteristic similar to that of the retardation film 117 in the first embodiment. One of these two retardation films 123 and 125 is used as a retardation film having a negative-uniaxial optical characteristic, which has an optical axis normal to the polarizing film as the retardation film 117, similarly to the TAC generally used as a polarizing-film protection layer. An advantage similar to that of the first embodiment is obtained whereby a shortage of retardation which is caused by TAC is compensated for by the other retardation film.

In the following, the retardation films 123 and 125 will be described together, while replacing these films with the retardation film 117. The first polarizing layer 101 in the light-incident side has a polarizing layer 120 made of, for example, PVA as shown in FIG. 9B, and a protection layer 121 made of, for example, TAC. Also, the second polarizing layer 105 in the light-emitting side has a polarizing layer 120 and a protection layer 124, as shown in FIG. 9A. A conventional polarizing film is used with both sides of a polarizing layer thereof sandwiched between protection layers (TAC). In the present embodiment, however, the protection layer of the light-emitting-side polarizing film in the glass substrate side is replaced by the retardation films 117 and 118, and the protection layer of the light-incident-side polarizing film in the glass substrate side is replaced by the retardation film 119. The retardation films have a function for protecting polarizing layers. The protection layers 121 and 124 each function similar to that of a negative-uniaxial retardation film having an optical axis extending in the direction normal to the surface of the polarizing film. The protection layers 121 and 124 respectively have retardations corresponding to the thickness thereof.

As shown in FIG. 9A, the retardation films 117 and 118 having predetermined optical characteristics are provided between the glass substrate 116 and the second polarizing layer 105 in the light-emitting side. As shown in FIG. 9B, a retardation film 119 having a predetermined optical characteristic is provided between the glass substrate 106 and the first polarizing layer 101 in the light-incident side. The retardation films 117, 118, and 119 can be formed, for example, by adhesion or coating. If the retardation of the retardation film 119 in the thickness direction thereof is 0 nm, a similar effect can be attained even when the polarizing film is adhered directly on to the glass substrate without protection layers.

The optical compensation polarizing films constituting the LCD device 100 were subjected to a simulation in which the structure shown in FIGS. 9A and 9B was adopted. With respect to optical characteristics including the retardations of the retardation films 117, 118, and 119, the simulation provided the conditions under which leakage of light in an oblique view during displaying black color could be reduced to an unnoticeable level. Before the simulation, an experiment was carried out by gradually lowering luminance of a backlight in a conventional IPS-mode LCD device, to confirm: at what level of luminance of the backlight, as the luminance is being lowered, leakage of light in an oblique view during displaying black color would not significantly influence the image quality. The following could be confirmed as a result of this experiment. When the luminance of the backlight was ½ of normal luminance, leakage of light in the oblique view during displaying black color provided less influence on display. When the luminance of the backlight was ¼, leakage of light in the oblique view during displaying black color was not substantially perceived. Hence, as a level at which leakage of light became unnoticeable in case of observing the display from the oblique view during displaying black color, such a level was adopted that reduced light leakage quantity to half the reference level.

A range in which the chromaticity difference when observed from the directions of the front and oblique views was not adversely affected by optical compensation was also adopted as a condition for selecting a suitable range. In this selection, it is assumed that the chromaticity ratio between the directions of the front and oblique views without optical compensation is "1" as a reference and the chromaticity ratio is expressed using $\Delta u$ 'V'. References for selecting ranges of retardations of the retardation films 117 and 119 in the thickness direction were set to the following ranges. That is, the films 117 and 119 could be used generally as polarizing-film protection layers, and the effect of suppressing leakage of light could be greater compared with a case of using a TAC layer of 80 µm having a retardation of 50 nm in the thickness direction a negative-uniaxial optical characteristic of (n1−n2) ≈0 as well. As a direction of an oblique view for these films, the direction at an azimuth angle 45° and a polar angle 45° to the optical axis of the polarizing films was adopted.

As shown in FIG. 3, for definition of the retardation of the retardation films, the in-plane refractive indexes including the optical major-axis were n1 and n2, the refractive index in the thickness direction is nz, d [mm] is an effective thickness of the retardation film in terms of the thickness of the liquid crystal layer. The in-plane retardation was defined as an absolute value of (n1−n2)×d, and the retardation in the thickness direction is defined as [{(n1+n2)/2}−nz]×d. In the simulation, retardation films 117 and 119 having a negative-uniaxial optical characteristic of (n1−n2)≈0 were used, and a retardation film 118 having an optical characteristic of (ns−nz)/(ns−nf)=0 was used. The retardation film 18 satisfies the relationship no=n1≧nz>n1=n2.

In the simulation, ranges in which leakage of light in the oblique view from the direction at the azimuth angle 45° and the polar angle 45° during displaying black color could be suppressed to an unnoticeable level were derived under the conditions wherein: the retardations of the retardation film 117 in the thickness direction thereof were 50 nm and 80 nm; the in-plane retardation of the retardation film 118 was 130 nm; and the retardation of the retardation film 119 in the thickness direction thereof was 0 to 50 nm. The derived ranges are similar to those shown in FIG. 4. Within the ranges according to this simulation, the transmittance ratio is 0.5 or less throughout the whole range of the retardation of the retardation film 119 in the thickness direction. Thus, an optical compensation effect can be recognized. From studies in details of the effect of each of the retardation films, it has been found that the transmittance decreases as the retardation of the retardation film 117 in the thickness direction is increased and as the retardation of the retardation film 119 in the thickness direction is decreased.

Next, the range of the retardation film 117 was derived under the conditions wherein: the in-plane retardation of the retardation film 118 was 130 nm; and the retardation film of the retardation film 119 in the thickness direction was 0 nm. The derived range is similar to that shown in FIG. 5. As can be seen from this figure, the transmittance decreases within the range of 50 to 123 nm of the retardation of the retardation film 117 in the thickness direction. The range of the retardation film 118 was derived under the conditions wherein: the retardation of the retardation film 117 in the thickness direction was 80 nm; and the retardation of the retardation film 119 in the thickness direction was 0 nm. The derived range is similar to that shown in FIG. 6. As a result, the in-plane retardation of the retardation film 118 is within the range of 35 to 245 nm, and the transmittance ratio is 0.5 or less.

On the other hand, the range in which the chromaticity ratio between the directions of the front and oblique views did not deteriorate was derived under the conditions wherein: the retardations of the retardation film 117 in the thickness direction were 50 and 80 nm; the in-plane retardation of the retardation film 118 is 130 nm; and the retardation of the retardation film 119 in the thickness direction was 0 to 50 nm. The derived range is similar to that shown in FIG. 7. Within the range of this simulation, the chromaticity ratio is 1 or less throughout the range of 0 to 50 nm of the retardation of the retardation film 119 in the thickness direction, when the retardation of the retardation film 117 in the thickness direction is 50 nm. Next, when the retardation of the retardation film 117 in the thickness direction is 80 nm, the chromaticity ratio is 1 or less, within the range of 35 nm or less of the retardation of the retardation film 119 in the thickness direction. As the retardation of the retardation film 119 further decreases, the chromaticity ratio decreases.

As has been described above, the chromaticity ratio is dependent on the retardation of the retardation film 117 in the thickness direction. Hence, a simulation was carried out within a range including the range of 50 to 123 nm of the retardation of the retardation film 117 in the thickness direction, which effectively reduced the luminance. A combination of retardations of the retardation films 117 and 119 that made the chromaticity ratio 1 or less was derived. The derived result is similar to that shown in FIG. 8. The following has been found from this figure. election of a part in which the transmittance ratio is 0.5 or less and the chromaticity ratio is 1 or less provides a rectangular area shown in FIG. 8, i.e., wherein retardation of the retardation film 119 in the thickness direction falls within the range of 0 to 35 nm, and retardation of the retardation film 117 in the thickness direction falls in a range of 50 to 123 nm.

In the result shown in FIG. 8, a range which reduces the chromaticity ratio to half is selected here as the range effective for reducing the chromaticity difference. Where the retardation nil of the retardation film 119 in the thickness direction is within the range of 0 to 17 nm, the retardation ncl of the retardation film 117 in the thickness direction should fall in the range as follows.

$$57.0-0.23\times nil+0.11\times nil^2 \leq ncl \leq 120.0-0.42\times nil-0.08\times nil^2$$

Thus, the retardation of the retardation film 119 in the thickness direction is reduced to be smaller than the retardation of TAC in the thickness direction, which is used for protection layers in conventional polarizing films. Changes in polarization in the liquid crystal layer are thereby reduced. Therefore, both the luminance ratio and the chromaticity ratio can be reduced to half values by using the present optical compensation polarizing film in a homogeneously-oriented LCD device.

As a result of suppressing leakage of light in the oblique direction during displaying black color, the contrast ratio in the front direction improves to provide an image of higher resolution. In a surface treatment conducted on a polarizing film which has been subjected to a haze treatment for the purpose of improving visibility of an LCD device, a problem generally occurs in that light emitted in the oblique direction is emitted in the front direction due to the surface treatment, to thereby deteriorate the contrast ratio. Against this problem, light in the oblique direction, which is emitted in the front direction due to the surface treatment, is suppressed by performing optical compensation, to lower the luminance in the front direction during displaying black color.

In the present embodiment, the combination of retardations of the retardation films 117 and 119 is set within the range indicated by the frame of the thick line in FIG. 8, and the transmittance ratio of the retardation film 118 is set within the range of 0.5 or less as shown in FIG. 6. In this manner, leakage of light in the oblique view during displaying black color is reduced to an unnoticeable level without deterioration in the chromaticity difference between the directions of the front and oblique views. This can be considered as follows. Dispersion of light caused by the liquid crystal layer 103 and the CF substrate 104 can be suppressed by the retardation films 117 and 118, by setting the retardations of the retardation films 117, 118, and 119 in consistence with the combination within the range described above. As a result, a state of less dispersion of light can be created at the position of the polarizing layer 120 configuring the second polarizing layer 105 in the light-emitting side. In the present embodiment, leakage of light in the oblique view during displaying black color can be reduced as described above, whereby the image quality of the LCD device improves.

The present invention has been described above on the basis of preferred embodiments. However, the optical compensation polarizing film and the LCD device according to the present invention are not limited to the embodiments described above. Various changes and modifications to the configurations of the above embodiments should be considered to be within the scope of the present invention.

What is claimed is:

1. An optical compensation polarizing film pair comprising:
    a first compensation polarizing film including a first protecting layer, a first polarizing layer, a first retardation film and a negative-uniaxial second retardation film, which are arranged in this order: and
    a second compensation polarizing film used in pair with said first compensation polarizing film and including a second protecting layer, a second polarizing layer, and a third retardation film, which are arranged in this order:
    said first retardation film having a birefringence wherein an in-plane retardation is 35 to 245 nm, and refractive indexes therein satisfy the following relationship: $n1 \geq nz > n2$, given n1 and n2 being refractive indexes of optical axes extending perpendicular to each other within said first retardation film and given nz being a thickness-direction refractive index of said first retardation film, one of said optical axes of said first retardation film having said refractive index of n1 extending normal to an absorption axis of said first polarizing layer;
    said second retardation film having a birefringence wherein an in-plane retardation is 0 to 15 nm, and a thickness-direction retardation is 50 to 123 nm, said second retardation film having an optical axis normal to a surface of said first polarizing layer;
    said third retardation film having a birefringence wherein an in-plane retardation is 0 to 10 nm and a thickness-direction retardation is 0 to 35 nm.

2. The optical compensation polarizing film pair according to claim 1, wherein said in-plane retardation of said second retardation film is 0 to 10 nm, and said thickness-direction retardation nc1 of said second retardation film satisfying the following relationship:

$$57.0 - 0.23 \times nil + 0.11 \times nil^2 \leq nc1 \leq 120.0 - 0.42 \times nil - 0.08 \times nil^2$$

for the case where said in-plane retardation of said third retardation film is 0 to 7 nm and said thickness-direction retardation of said third retardation film is 0 to 17 nm.

3. The optical compensation polarizing film pair according to claim 1, wherein said second retardation film includes a plurality of layers.

4. The optical compensation polarizing film pair according to claim 3, wherein at least one of said plurality of layers in said second retardation film configures a protection layer protecting said first polarizing layer.

5. The optical compensation polarizing film pair according to claim 4, wherein said protection layer includes triacetylcellulose (TAC).

6. A liquid crystal display (LCD) device comprising the optical compensation film pair according to claim 1, and a homogeneously-oriented liquid crystal layer sandwiched between said optical compensation film pair, wherein said first polarizing layer has an absorption axis normal to an absorption axis of said second polarizing layer.

7. The LCD device according to claim 6, wherein another of said optical axes of said first retardation film having said refractive index of n2 is parallel to an optical axis of said homogeneously-oriented liquid crystal layer.

* * * * *